United States Patent [19]

Van Roessel

[11] 3,852,674

[45] Dec. 3, 1974

[54] PARABOLA AND SAWTOOTH GENERATOR

[75] Inventor: Frederik J. Van Roessel, Upper Saddle River, N.J.

[73] Assignee: Philips Broadcasting Equipment Corporation, Montvale, N.J.

[22] Filed: Aug. 24, 1973

[21] Appl. No.: 391,077

[52] U.S. Cl. .................. 328/127, 235/183, 235/197, 307/229, 328/142, 328/181

[51] Int. Cl. .................. G06g 7/18

[58] Field of Search .................. 307/228, 229, 230; 328/127, 142, 181–185; 235/183, 197

[56] References Cited

UNITED STATES PATENTS

| | | | |
|---|---|---|---|
| 3,465,167 | 9/1969 | Hollins | 307/229 |
| 3,543,049 | 11/1970 | Farnsworth | 307/228 |
| 3,566,088 | 2/1971 | Crook | 328/127 |
| 3,578,985 | 5/1971 | Edson | 328/127 |
| 3,586,874 | 6/1971 | Ferro | 307/229 |
| 3,676,697 | 7/1972 | Davenport | 307/228 |
| 3,715,487 | 2/1973 | Blake | 307/229 |

OTHER PUBLICATIONS

"I C Ramp Generator is Simple and Fast" by Bidgeon in Electronic Design 25, Dec. 5, 1968, pages 94 & 96.

*Primary Examiner*—Stanley D. Miller, Jr.
*Attorney, Agent, or Firm*—Frank R. Trifari; Henry I. Steckler

[57] ABSTRACT

An integrator circuit has an operational amplifier with a capacitor in a feedback path. Also in the feedback path is a diode to provide a stable starting D.C. level for the integrator. A second diode can be used for thermal and threshold compensation.

11 Claims, 2 Drawing Figures

PARABOLA AND SAWTOOTH GENERATOR

The present invention relates to integrators, and more particularly to integrators for use in color television cameras.

In television cameras, it is necessary to generate sawtooth and parabolic waveforms which are multiplied with the video signal to correct for certain distortion effects in the optical system in front of camera tube, and added to the video signal to correct for certain electrical deficiences. Typical prior art circuits used a first operational amplifier integrator to integrate a D.C. voltage to obtain a sawtooth voltage, and a second such integrator to obtain a parabolic voltage. A problem with such circuits is that the base line to which the waveforms periodically return can drift and seriously impede the video signal correction operation. One way to overcome this problem is with a peak detector and a narrow band filter in a feedback loop, such as is shown in U.S. Pat. No. 3,715,487. However, a problem with such a circuit is that D.C. problems occur when there is any irregularity in pulses applied to the circuit, such as may occur during the vertical blanking interval because of the narrow bandwidth of the filter.

It is therefore an object of the present invention to provide an integrator circuit that has an output signal with a stable base line.

It is a further object to provide such a circuit which is immune to irregularities in the input signal.

In brief, these and other objects are achieved by having an operational amplifier with a capacitor coupled in a negative feedback loop about the amplifier. Also coupled in said loop is a diode that clamps the base line of the output voltage to a fixed level so that a stable output signal results. Another diode can be used to correct for the offset voltage of the first diode. Corrections occur with each horizontal synchronization pulse, which prevents buildup of errors in the D.C. level of the output signal.

Figure 1:
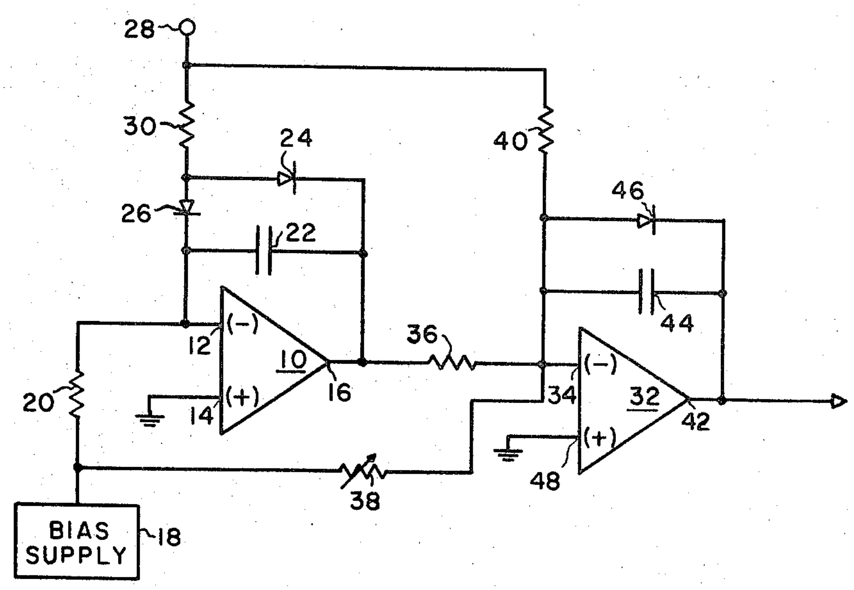
Figure 2:
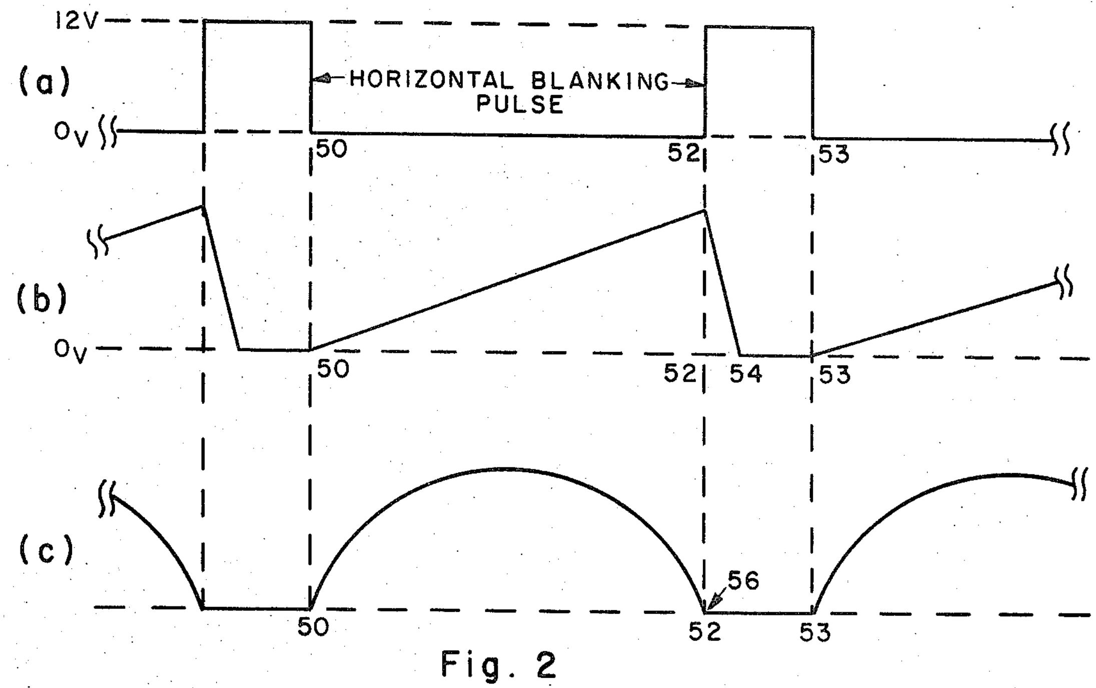

These and other objects will become apparent from the description when taken in conjunction with the following drawings in which:

FIG. 1 is a schematic diagram of a circuit in accordance with the invention; and FIG. 2 (curves *a*, *b* and *c*) shows waveforms associated with said circuit.

In FIG. 1, there is shown an operational amplifier 10 having an inverting input 12, a grounded non-inverting input 14, and an output 16. A bias supply 18, typically of −12 volts, is coupled to inverting input 12 through a resistor 20. A capacitor 22 is coupled between output 16 and inverting input 12. A clamping diode 24 has its cathode connected to output 16, while its anode is connected to the anode of compensation diode 26. The cathode of diode 26 is coupled to input 12. A terminal 28 receives a keying signal of horizontal blanking pulses, shown in FIG. 2a, and applies them through resistor 30 to the anode of diodes 24 and 26.

A second operational amplifier 32 receives at its inverting input 34 the signal from output 16 through resistor 36, a bias voltage from supply 18 through variable resistor 38, and the horizontal blanking pulses through resistor 40. An output 42 is coupled to inverting input 34 through capacitor 44 and clamping diode 46. Non-inverting input 48 is grounded.

Consider first the operation of the sawtooth generator. During the horizontal scan time between times 50 and 52 in FIG. 2a, terminal 28 has zero volts applied to it, while supply 18 applies −12 volts to input 12. Diodes 24 and 26 are not conducting since they are not forward biased. In this case amplifier 10 and capacitor 22 operate as an integrator, integrating the supply 18 voltage across capacitor 22, producing the sawtooth voltage shown in FIG. 2*b* at output 16. When the horizontal blanking pulse occurs between interval 52 and 53, it forward biases the diode 26, and is therefore applied to input 12 and quickly discharges capacitor 22 during the 52–54 time interval. At time point 54, diode 24 starts conducting, and it clamps the output voltage to zero volts during the 54–53 time interval in FIG. 2*b*, by providing an alternate path for discharging current through resistor 30. Diode 26 nearly compensates for the forward voltage drop of diode 24 to ensure that the clamp level is substantially zero volts. Ideally, diode 26 should have the same voltage drop verses temperature characteristic as does diode 24. It will be seen that the base line of FIG. 2*b* is definitely clamped regardless of voltage changes in supply 18, the horizontal blanking pulses, or D.C. offset voltage in amplifier 10.

The operation of the second integrator is similar to that of the first. However since it is receiving a sawtooth voltage as the input signal through resistor 36, its output signal will be a parabolic signal shown in FIG. 2*c*. Here diode 46 does the clamping action during the 52–53 time interval, while resistor 38 is adjusted so that the end portion 56 of the parabola signal coincides with point 52 of the blanking pulse. Resistor 38 adjusts the width of the parabola from points 50 to 56, without effect on the D.C. output level in any way. The discharging action through resistor 40 is made large enough by selecting the value of resistor 40, to discharge capacitor 44 even if only one-half of a parabola has been completed. This happens during the half scanning lines at the top and bottom of the picture.

It will be seen that tolerences in the components do not effect the D.C. level in the output signal because of the clamping action.

It will be appreciated that many variations are possible without departing from the spirit and scope of the invention. For example, vertical rate sawtooth and parabola signals can be generated using a vertical rate input signal at point 28.

What is claimed is:

1. A circuit for integrating an input voltage in accordance with a keying signal, said circuit comprising a first amplifier having a non-inverting first input means for receiving a reference potential, an inverting second input means for receiving said input voltage and said keying signal, and an output means for supplying a first amplifier signal in accordance with the potential difference between said inputs; a first capacitor coupled between said output and said second input; first means for eliminating the effects of direct current offsets on said circuit comprising a first diode having an anode-cathode voltage drop coupled between said output and said second input; and means for compensating for said voltage drop comprising a second diode series coupled between said first diode and said second input.

2. A circuit as claimed in claim 1 wherein said first input is coupled to ground.

3. A circuit as claimed in claim 1 wherein said diode comprises an anode coupled to said second input and a cathode coupled to said output.

4. A circuit as claimed in claim 1 further comprising means coupled to said second input for adjusting said input voltage, whereby the waveform of said output voltage is controlled.

5. A circuit as claimed in claim 1 further comprising a second amplifier having a non-inverting first input means for receiving a reference potential, an inverting second input means for receiving said keying signal and coupled to said first amplifier output for receiving said first amplifier signal, and an output means for supplying a second amplifier signal in accordance with the potential difference between said second amplifier inputs; a second capacitor coupled between said second amplifier output and second input means; and second means for eliminating the effects of direct current offsets on said circuit comprising a third diode coupled between said second amplifier output and second input means.

6. A circuit as claimed in claim 5 further comprising means coupled to said second amplifier second input for adjusting the voltage applied thereto, whereby the waveform of said second amplifier output voltage is controlled.

7. A circuit for integrating an input voltage in accordance with a keying signal, said circuit comprising a first amplifier having a non-inverting first input means for receiving a reference potential, an inverting second input means for receiving said input voltage and said keying signal, and an output means for supplying a first amplifier signal in accordance with the potential difference between said inputs; a first capacitor coupled between said output and said second input; first means for eliminating the effects of direct current offsets on said circuit comprising a first diode coupled between said output and said second input, a second amplifier having a non-inverting first input means for receiving a reference potential, an inverting second input means for receiving said keying signal and coupled to said first amplifier output for receiving said first amplifier signal, and an output means for supplying a second amplifier signal in accordance with the potential difference between said second amplifier inputs; a second capacitor coupled between said second amplifier output and second input means; and second means for eliminating the effects of direct current offsets on said circuit comprising a second diode coupled between said second amplifier output and second input means.

8. A circuit as claimed in claim 7 wherein said first amplifier first input is coupled to ground.

9. A circuit as claimed in claim 7 wherein said first diode comprises an anode coupled to said first amplifier second input and a cathode coupled to said first amplifier output.

10. A circuit as claimed in claim 7 further comprising means coupled to said second amplifier second input for adjusting the voltage applied thereto, whereby the waveform of said second amplifier output voltage is controlled.

11. A circuit as claimed in claim 1 wherein both of said diodes have substantially similar voltage drop versus temperature characteristics.

* * * * *

UNITED STATES PATENT AND TRADEMARK OFFICE

CERTIFICATE OF CORRECTION

PATENT NO. : 3,852,674

DATED : December 3, 1974

INVENTOR(S) : FREDERIK J. VAN ROESSEL

It is certified that error appears in the above-identified patent and that said Letters Patent are hereby corrected as shown below:

IN THE TITLE PAGE cancel "Philips Broadcasting Equipment Corporation" to --

Philips Broadcast Equipment Corporation --;

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*